United States Patent
Thomas et al.

(10) Patent No.: US 6,525,769 B1
(45) Date of Patent: Feb. 25, 2003

(54) METHOD AND APPARATUS TO COMPENSATE FOR DARK CURRENT IN AN IMAGING DEVICE

(75) Inventors: Brent D. Thomas, Chandler; Morteza Afghahi, Tempe, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/223,130

(22) Filed: Dec. 30, 1998

(51) Int. Cl.[7] .................................................. H04N 9/64
(52) U.S. Cl. ........................ 348/243; 348/241; 348/245; 348/607
(58) Field of Search .............................. 348/241, 242, 348/243, 244, 245, 246, 247, 248, 606, 607, 615, 622; 358/463

(56) References Cited

U.S. PATENT DOCUMENTS

| | | | |
|---|---|---|---|
| 4,562,473 A | * 12/1985 | Levine | 348/244 |
| 4,910,599 A | * 3/1990 | Hashimoto | 348/240 |
| 4,916,307 A | * 4/1990 | Nishibe et al. | 348/243 |
| 4,984,085 A | * 1/1991 | Landowski | 348/243 |
| 5,105,276 A | * 4/1992 | Schrock | 348/241 |
| 5,181,118 A | * 1/1993 | Kimura | 348/247 |
| 5,216,511 A | 6/1993 | Tani | 358/213.16 |
| 5,278,658 A | * 1/1994 | Takase | 348/243 |
| 5,416,345 A | 5/1995 | Matsunaga | 257/223 |
| 5,471,244 A | 11/1995 | Wolfe | 348/257 |
| 5,608,455 A | 3/1997 | Oda | 348/245 |
| 5,623,306 A | 4/1997 | Kajihara et al. | 348/243 |
| 5,654,755 A | * 8/1997 | Hosier | 348/245 |
| 6,069,660 A | * 5/2000 | Sato | 348/379 |
| 6,157,424 A1 | * 1/2001 | Iino et al. | 358/1.9 |

FOREIGN PATENT DOCUMENTS

| | | | |
|---|---|---|---|
| EP | 0281349 | 9/1988 | H04N/5/217 |
| JP | 06268917 | 9/1994 | H04N/5/335 |
| WO | 89/10037 | 10/1989 | H04N/3/00 |

* cited by examiner

*Primary Examiner*—Wendy R. Garber
*Assistant Examiner*—Jacqueline Wilson
(74) *Attorney, Agent, or Firm*—Schwegman, Lundberg, Woessner & Kluth, P.A.

(57) ABSTRACT

An imaging device includes a compensation circuit for reducing an effect of dark current generated during operation. The compensation circuit calculates an initial dark current offset value using optically dark regions of a photo sensitive array. The compensation circuit also automatically adjusts the initial dark current offset value as output signals from successive rows of the photo sensitive array are transferred. The compensation circuit can calculate the initial dark current offset value each time an image is captured, thereby compensating for variables such as temperature.

30 Claims, 3 Drawing Sheets

METHOD AND APPARATUS TO COMPENSATE FOR DARK CURRENT IN AN IMAGING DEVICE

TECHNICAL FIELD

The present invention relates generally to image sensing and, in particular, to dark current compensation.

BACKGROUND

Solid state imaging devices, such as, charge coupled devices (CCD) and complementary metal oxide semiconductor (CMOS) imaging devices are used in different electronic devices, such as digital cameras, copiers and scanners. The imaging devices include a number of photodiodes arranged in a pixel matrix having vertical columns and horizontal rows. During operation, the photodiodes are exposed to a light source. For example, a shutter of a digital camera is opened to expose a photodiode array. The incident photons are converted to electrons and stored as a charge on the photodiodes. These charges represent the light image exposed to the photodiode matrix. The charges of the photodiodes are transferred to a processing unit for converting the charge to digital data. For example, an image captured by an array of photodiodes in a camera is processed and stored in memory for future viewing and/or printing.

A standard method of transferring an image captured by a CCD array is to sequentially read each pixel of a row, and then sequentially read each pixel of a subsequent row. This method is repeated until each pixel of the array has been read. Because the entire photodiode array is exposed to light simultaneously, and the photo diode charges are transferred serially, there can be a substantial time period between exposing the array and transferring a charge of the last photodiode pixel. Further, solidstate image devices are volatile. That is, photodiodes are susceptible to leakage current and therefore lose charge overtime. This charge loss is particularly noticeable when the array is dark, or no longer exposed to the light source. The photodiode leakage current during the dark period is referred to as a dark current. This dark current is a function of temperature, fabrication variables, and the length of time in which the photodiode is dark (exposure and read out time). A variable error, therefore, is induced during the time period between exposing the array and reading out the last photodiode. The dark current is always present in the imaging device. That is, dark current is present during both exposure (some times referred to as integration) and when there is not incident light.

Different approaches have been proposed for eliminating or compensating for dark currents. For example, U.S. Pat. No. 5,608,455 entitled "Interline Transfer CCD Image Sensor with Reduced Dark Current" issued Mar. 4, 1997 describes a CCD image sensor which uses optical black areas located between an image pick up area and a horizontal transfer path. The CCD image sensor captures and stores a dark image of the active array. During the data transfer operation of an exposed image, the stored dark image of the active array is used to compensate for dark current errors. Additional approaches have been proposed which compensate for dark currents by manipulating transfer operations, or physical processing variations.

For the reasons stated above, and for other reasons stated below which will become apparent to those skilled in the art upon reading and understanding the present specification, there is a need in the art for accurate reduction of dark current errors in imaging devices.

SUMMARY OF THE INVENTION

In one embodiment, an imaging device comprises an imaging array comprising a plurality of photo sensitive pixels arranged in a plurality of rows and columns. The imaging array further comprises an active area, a first optically dark area comprising at least one row of pixels, and a second optically dark area located adjacent to the active area and comprising at least one column of pixels. A compensation circuit is coupled to the imaging array. The compensation circuit generates an initial dark current offset value from an output signal of the first optically dark area, and adjusts the initial dark current offset value using an output signal of the second optically dark area.

In another embodiment, an imaging device compensation circuit comprises an input node for receiving an output signal from an optically sensitive device, a buffer circuit coupled to the input node, a reference voltage circuit coupled to an input node of the buffer circuit via a first switch circuit, and an integrator circuit coupled to an output signal of the buffer circuit. The integrator circuit has an output node coupled to an input node of the buffer circuit via a second switch circuit.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present invention is defined only by the appended claims.

Figure 1:
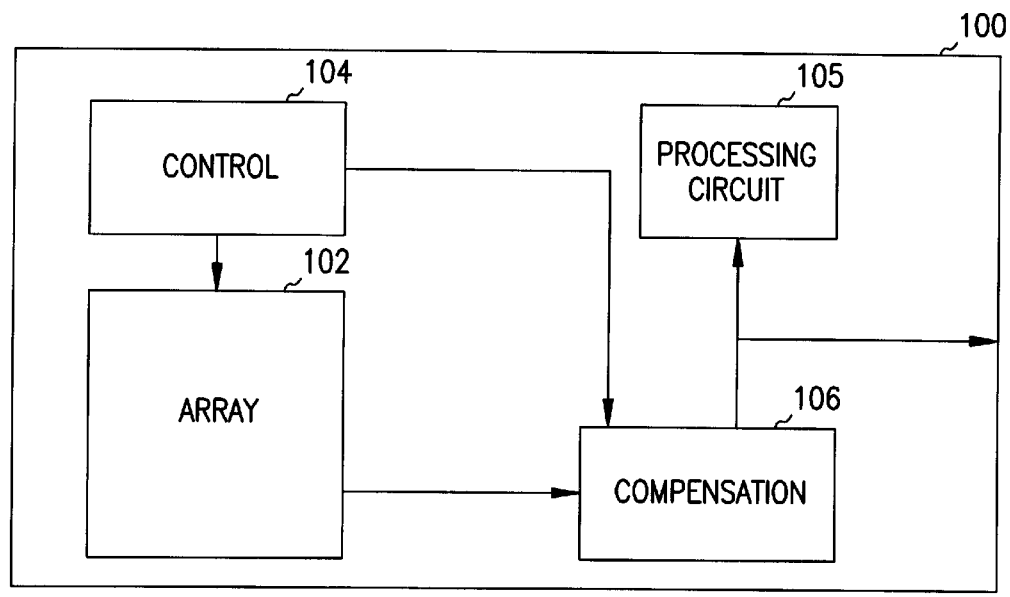
FIG. 1 is a block diagram of an imaging device of one embodiment of the invention.

Referring to FIG. 1, an imaging device is illustrated which compensates for dark current experienced during an array transfer operation. The imaging device 100 includes an array of photo sensitive cells, or pixels 102, such as photodiodes, a compensation circuit 106 for reducing error experienced by the photo sensitive cells, and a control circuit 104 to control operation of the imaging device and data transfer from the array. An optional processing circuit 105 can be provided to process and/or store data transferred from the array. Likewise, output signals from the compensation circuit can be output from the imaging device for external processing.

As explained above, the photo sensitive array 102 captures a light image which is exposed to the array. The array includes numerous rows and columns of photo sensitive cells, or pixels, which experience leakage (dark) currents. Because a variable time differential is experienced between exposing the array to a light source and transferring pixel charges from the array, a variable (increasing) dark current build-up is experienced which induces error in the charge stored on the pixels. As known to those skilled in the art, the dark current is a function of device temperature and integration time. That is, both environmental and operational variables change the effect of the dark current.

Figure 2:
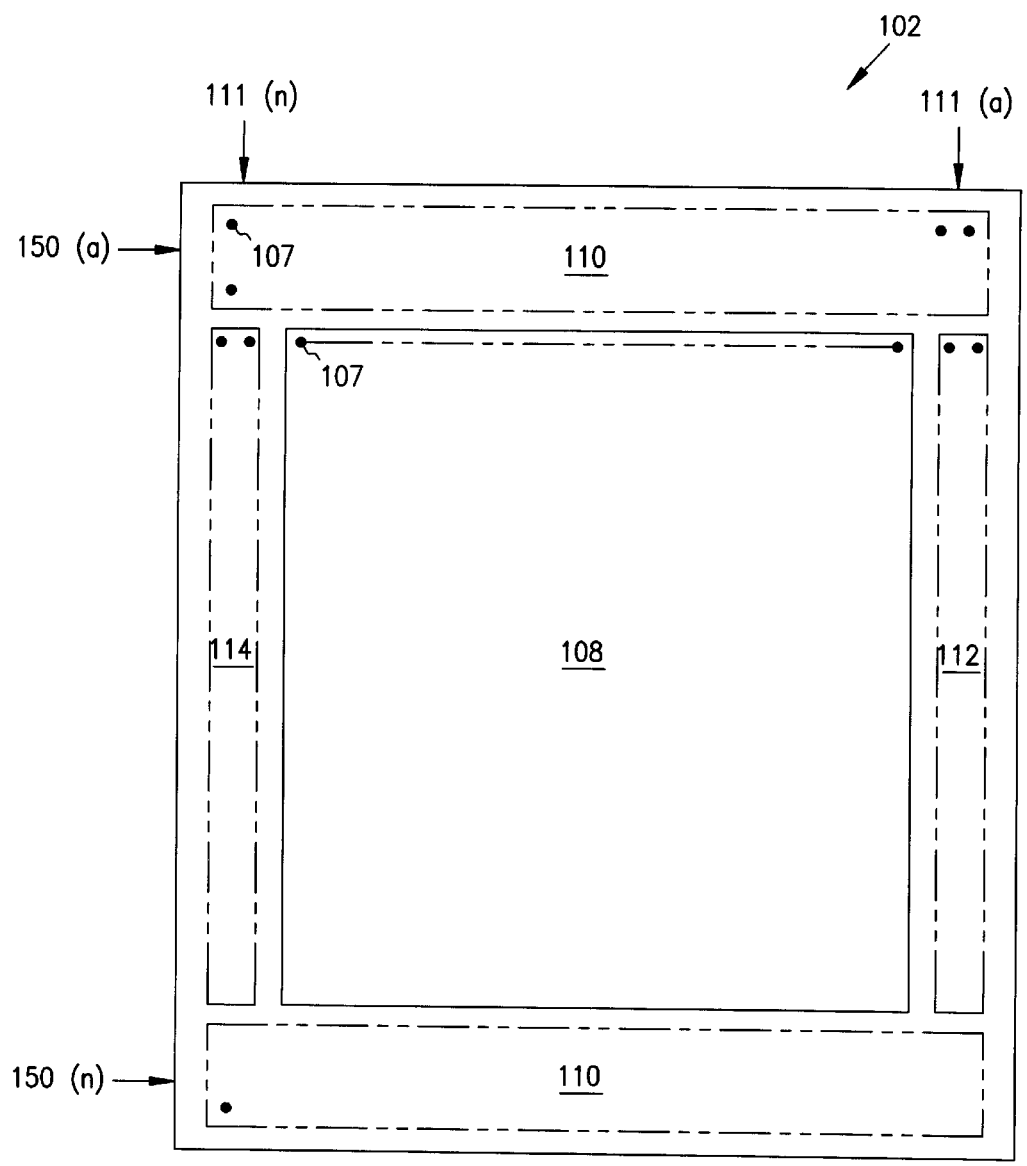
FIG. 2 illustrates an imaging array of the imaging device of FIG. 1.

In one embodiment of the imaging device, a compensation circuit 106 is provided which compensates for dark current changes over an array transfer operation. Prior to describing the transfer circuit, array 102 is described in more detail. Referring to FIG. 2, one embodiment of array 102 is illustrated. The array includes a matrix of photo sensitive pixels 107 which are arranged in numerous rows and columns. The array includes an active area 108 which is exposed to light during operation of the imaging device. Photo sensitive elements 107 can be any type of solid-state photo sensitive device, such as, but not limited to, complementary metal oxide semiconductor (CMOS) photodiodes. An optically dark region 110 is provided adjacent to the array and includes a plurality of rows of photo sensitive pixels. It will be appreciated by those skilled in the art, with the benefit of the present disclosure, that optically dark region 110 can be located on either, or both, sides of active region 108. Only one region 110 is required for the present invention.

A difference between optically dark region 110 and active region 108 is that photo sensitive pixels located in the optically dark region are shielded from incident light. This can be accomplished by fabricating a layer of metal, such as aluminum, over the pixels. A second optically dark region 112 is located on one edge of the array and includes a plurality of columns of photo sensitive pixels. An optional optically dark region 114 can be located on an opposite edge of the array and includes a plurality of columns of pixels. During a read operation from the array, a charge is serially read from each row. For example, array 102 can be read by first read a charge from a pixel 107 located at an upper right corner of array 102 (row 150(a), column 111 (a)), and then serially reading a charge from pixels located in row 150(a) until column 111 (n) is reached. Data from a subsequent row is then read following the same process until data from row 150(n) has been read. Although the above described transfer operation shifts charges from left to right, data can be read from the array from right to left, top to bottom, bottom to top, or mixed. As described below, regardless of the transfer scheme selected, data is read from optically dark region 110 prior to reading data from active area 108.

As known to those skilled in the art, photo sensitive elements 107 can be charged to a predetermined level prior to being exposed to incident light. As such, pixels of the array have a predetermined initial charge which is changed upon exposure to the incident light. The preparation of the array prior to integration is dependant upon the architecture of the imaging device, and not considered limiting to the present invention. The reduction in charge is proportional to an intensity of the light exposed to a particular pixel. In an ideal optical imaging device, the predetermined charge (offset factor) can be subtracted from the resultant charge to determine the image exposed using the incident light. Present imaging devices, however, experience error due to leakage type currents. The leakage current is a factor of temperature, and a cumulative result of the leakage current will vary depending upon a time in which data is exposed to the leakage current. Because these variables are not easily predicted, merely subtracting the predetermined charge level placed on the pixels will not provide an accurate representation of the incident light image.

Figure 3:
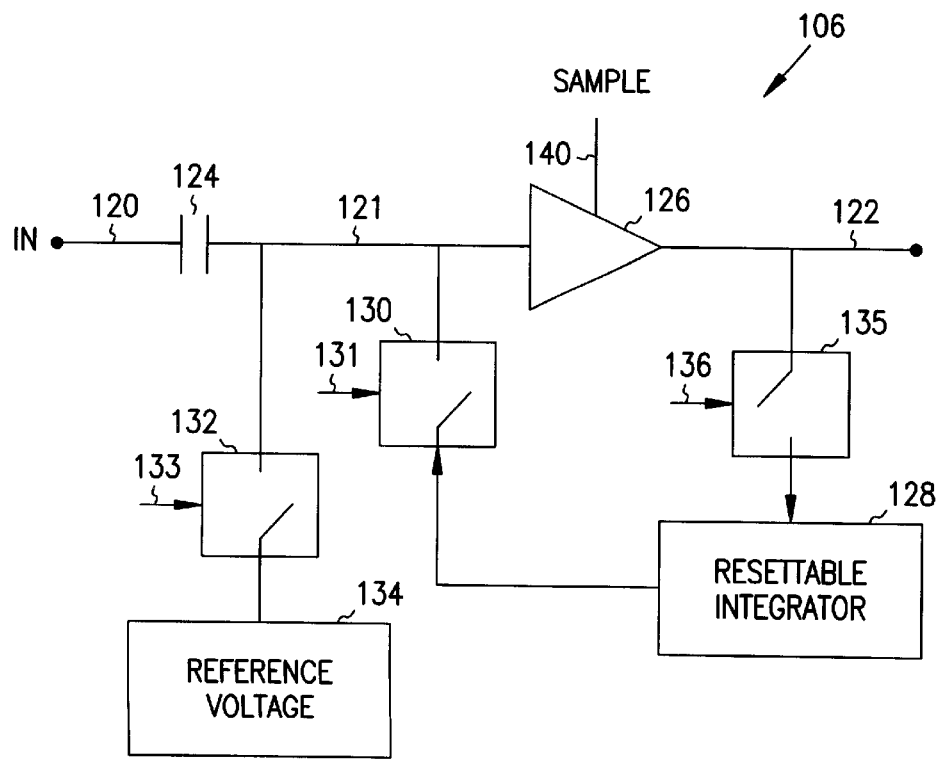
FIG. 3 is a diagram of a compensation circuit of the imaging device of FIG. 1.

Referring to FIG. 3, one embodiment of a compensation circuit 106 is provided which generates a beginning dark current offset factor for each image captured, and adjusts the beginning offset factor during data transfer operations. The compensation circuit includes an input node 120 for receiving a charge from pixels of the array. An optional coupling capacitor 124 is used to couple the charge to node 121. The compensation circuit operates in one of two modes, depending upon which area of the array is coupled to the compensation circuit. That is, when optically dark regions are coupled to the compensation circuit, a first operating mode is executed. When active area 108 is coupled to the compensation circuit, a second operating mode is executed. The first operating mode is used to establish the dark current-offset value which is subtracted from data read from the active area.

The compensation circuit illustrated in FIG. 3 includes a sample and hold buffer 126, a resettable integrator circuit 128, switch circuit 135, switch circuit 130, a reference voltage circuit 134, and switch circuit 132. Switches 130, 132 and 135 can be electrically controlled switches, such as field effect transistors (FETs) which are activated by control lines 131, 133 and 136, respectively. These switches can be controlled by controller 104. Reference voltage circuit 134 can be located external to the compensation circuit, and provides a reference voltage which approximates an initial dark current experienced by an array pixel. During the first operating mode when optically dark region 110 is being transferred to compensation circuit 106, switch circuit 132 is closed such that a reference voltage from reference voltage circuit 134 is coupled to node 121. This reference voltage is subtracted from an optically dark pixel charge coupled to node 121 via input node 120. The resultant voltage on node 121, therefore, represents a charge difference between the optically dark pixel and the reference voltage. The voltage on node 121 is sampled by buffer circuit 126 and coupled to integrator circuit 128 via closed switch 135. Integrator circuit 128 integrates the charge difference between all of the pixels in optically dark region 110 and the reference voltage. An integrated value representing the average dark current experienced during the transfer of region 110 is maintained in integrator circuit 128 as a dark current offset value which is used during data transfer from active region 108. It is important to note that a time constant used to obtain the offset value corresponds to the time necessary for transferring data from optically dark region 110.

When a charge is transferred from active area 108 to the compensation circuit, switch circuit 130 is closed and switch circuits 132 and 135 are opened. As pixel data charges are coupled to input node 120 from active area 108, the dark current offset value from integrator circuit 128 is subtracted at node 121. During this second mode of operation, integrator circuit 128 does not change the dark current offset value. Data provided at node 122, therefore, represents a charge read from pixels in area 108 offset by the offset value representing a dark current variable. As stated above, dark current is a factor of time and the offset value therefore will not accurately remove all dark current error induced as the transfer operation approaches row 150(n). Dark regions 112 and/or 114 are provided to adjust the offset value as the transfer operation progresses through successive rows.

To adjust the dark current offset value, charges from pixels located in regions 112 and/or 114 are coupled to integrator circuit 128 via switch 135, as described above. In one embodiment, switches 132 and 135 are closed and switch 130 is opened such that integrator circuit 128 adjusts the dark current offset value at each successive row of the array. Alternately, switch 132 is opened and switches 130 and 135 are closed. In this embodiment, the integrator compensates for the charge on node 121 prior to adjusting the offset value. In both embodiments, regions 112 and/or 114 are used to adjust the offset value coupled to node 121.

It will be appreciated by those skilled in the art, upon studying the present disclosure, that either or both optically dark regions 112 and 114 can be used to adjust the offset value. The compensation circuit, therefore, determines an initial dark current offset value and adjusts the dark current offset value as a captured image is transferred from array 102. As such, dark current variations which result from both fabrication and temperature changes are compensated for by establishing an initial offset value each time any image is captured. Further, dark current variation which results due to the time it takes to transfer active area data is compensated for by adjusting the offset value as each new row of pixels is transferred. The compensation circuit, therefore, provides a correlated double sample dark current compensation circuit which automatically adjusts to changes in the dark current.

The output signals provided at node 122 of the compensation circuit represents the charge stored on a pixel in array area 108, offset by the change in dark current. The output voltage, however, still includes a remnant of the initial charge placed on the array pixels prior to exposing the array to incident light. The differential between the initial charge value and the pixel charge after exposure provides a more accurate representation of the intensity of the incident light. To extract this data, the initial charge value can be eliminated using reference voltage circuit 134 during the second operating mode. That is, both switch circuits 130 and 132 are closed during a time when active area 108 is being transferred. The reference voltage and offset value from integrator 128, therefore, are both used to extract an image from a charge provided on node 120. Alternately, the initial charge can be removed from output node 122 using additional processing circuitry.

Figure 4:
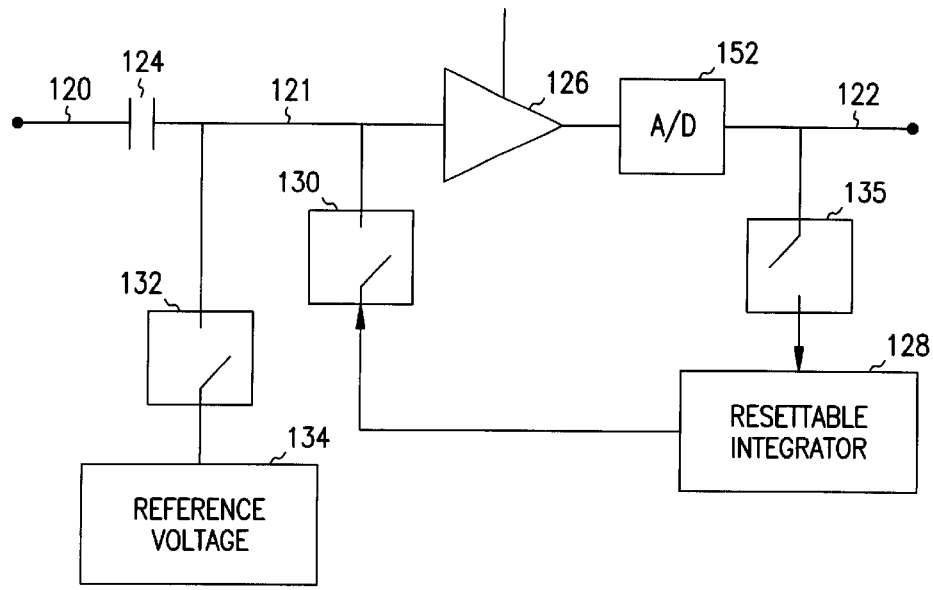
FIG. 4 is a diagram of an alternate compensation circuit of the imaging device of FIG. 1.
Figure 5:
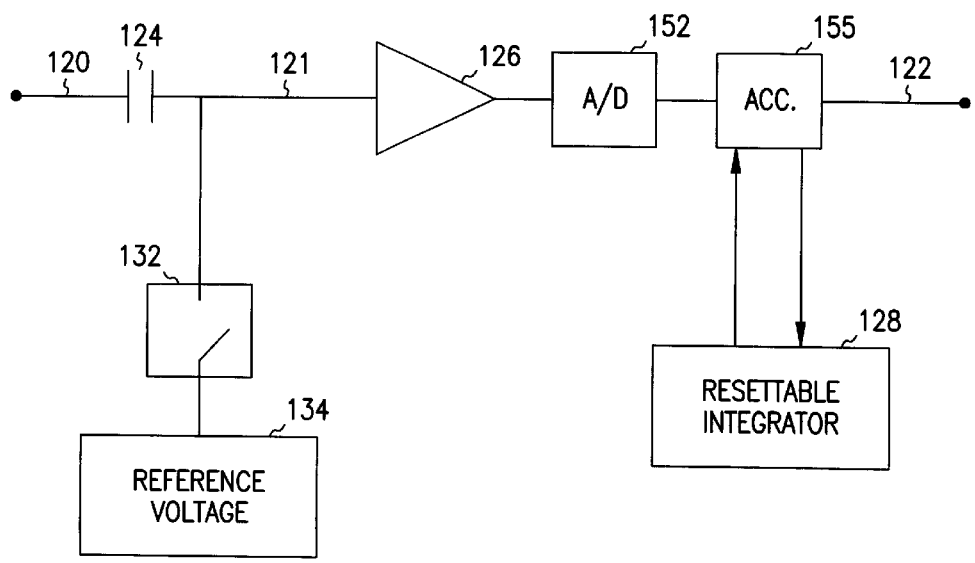
FIG. 5 is a diagram of an alternate compensation circuit of the imaging device of FIG. 1.

FIG. 4 illustrates an alternate embodiment of compensation circuit 106. An analog to digital (A/D) converter 152 is coupled to an output connection of sample circuit 126. The output signals at node 122, therefore, are digital. Likewise, resettable integrator 128 uses the digital input and provides an analog output voltage. A resettable integrator which provides a digital output is illustrated in FIG. 5. An accumulator circuit 155 is used to remove the offset value, provided by the integrator, from an output signal.

Imaging device 100 has been described herein in a simplified manner to illustrate the present invention. It will be appreciated that additional components and features can be provided in imaging device 100. For example, output node 122 of the compensation circuit can be coupled to additional internal processing circuitry 105 and/or coupled to external devices. In one embodiment, the imaging device is a camera and the internal processing circuitry is used to capture and store numerous images. The camera can be adapted to communicate with an external processor, printer, or network to transfer the captured images. Likewise, the imaging device can be a scanner, copier or similar device. Further, switch circuits 130, 132 and 135 represent control functions which can be incorporated into the remaining circuits. That is, integrator 128 can include circuitry which samples node 122 and couples an output signal to node 121 in response to control signals.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An imaging device comprising:
   an imaging array comprising a plurality of photo sensitive pixels arranged in a plurality of rows and columns, the imaging array further comprising an active area which can be selectively exposed to incident light to capture an image, a first optically dark area located adjacent to the active area and comprising at least one row of photo sensitive pixels, and a second optically dark area located adjacent to the active area and comprising at least one column of photo sensitive pixels, the photo sensitive pixels of the first and second optically dark areas are shielded from incident light; and
   a compensation circuit coupled to the imaging array, the compensation circuit generates an initial dark current offset value from the first optically dark area, and adjusts the initial dark current offset value using the second optically dark area, the compensation circuit comprises:
   a buffer circuit coupled to receive an output signal from the imaging array,
   a reference circuit to selectively couple a reference voltage to an input node of the buffer circuit, and
   an integration circuit to generate the initial dark current offset value, and adjust the initial dark current offset value.

2. The imaging device of claim 1 wherein the imaging device is a camera.

3. The imaging device of claim 1 wherein the reference circuit is-coupled to the buffer circuit through a switch circuit which is selectively activated when either the first or second optically dark areas are coupled to the compensation circuit.

4. The imaging device of claim 1 wherein the integration circuit is coupled to an input node of the buffer circuit through a switch circuit which is selectively activated when the active area is coupled to the compensation circuit.

5. An imaging device compensation circuit comprising:
an input node for receiving an output signal from an optically sensitive device;
a buffer circuit coupled to the input node;
a reference voltage circuit coupled to an input node of the buffer circuit via a first switch circuit; and
an integrator circuit coupled to an output signal of the buffer circuit, the integrator circuit having an output signal coupled to an input node of the buffer circuit via a second switch circuit.

6. The imaging device of claim 1 wherein said buffer circuit includes a sample and hold unit to perform a sample and hold operation on an analog output signal from the imaging array to generate an analog output signal.

7. An imaging device comprising:
an imaging array comprising a plurality of photo sensitive pixels arranged in a plurality of rows and columns, the imaging array further comprising an active area, a first optically dark area comprising at least one row of pixels, and a second optically dark area located adjacent to the active area and comprising at least one column of pixels; and
a compensation circuit coupled to the imaging array, the compensation circuit generates an initial dark current offset value from an output signal of the first optically dark area, and adjusts the initial dark current offset value using an output signal of the second optically dark area, said compensation circuit including:
a sample and hold circuit to perform a sample and hold operation on an analog charge signal from the imaging array to generate an analog output signal;
an integration circuit to maintain a dark current offset value at an output thereof, said dark current offset value being derived from said analog output signal of said sample and hold circuit; and
a first switch circuit to controllably couple said output of said integration circuit to an input of said sample and hold circuit.

8. The imaging device of claim 1 wherein:
said integration circuit is coupled to an input node of the buffer circuit through a switch circuit.

9. The imaging device of claim 1 wherein:
said switch circuit is selectively activated when the active area is coupled to the compensation circuit.

10. The imaging device of claim 1 wherein:
said compensation circuit determines the initial dark current offset value each time the active area is exposed to incident light.

11. The imaging device compensation circuit of claim 5 wherein:
said buffer circuit includes a sample and hold unit.

12. The imaging device compensation circuit of claim 1 wherein:
said reference voltage circuit generates a reference voltage that is related to an approximated initial dark current of said imaging array.

13. The imaging device comoensation circuit of claim 5 wherein:
said optically sensitive device includes an imaging array having a plurality of active photo elements and a plurality of optically dark photo elements that are shielded from incident light.

14. The imaging device compensation circuit of claim 13 further comprising:
a controller to activate said first switch circuit when said input node is receiving information from said plurality of optically dark photo elements.

15. The imaging device compensation circuit of claim 13 further comprising:
a controller to activate said second switch circuit when said input node is receiving information from said plurality of active photo elements.

16. The imaging device of claim 7 comprising:
a controller to activate said first switch circuit when the active area is coupled to the compensation circuit.

17. The imaging device of claim 7 comprising:
a controller to deactivate said first switch circuit when an optically dark area is coupled to the compensation circuit.

18. The imaging device of claim 7 comprising:
a reference circuit to selectively couple a reference voltage to the input of the sample and hold circuit via a second switch circuit.

19. The imaging device of claim 18 comprising:
a controller to activate said second switch circuit when an optically dark area is coupled to the compensation circuit.

20. The imaging device of claim 18 comprising:
a controller to deactivate said second switch circuit when the active area is coupled to the compensation circuit.

21. The imaging device of claim 18 wherein:
said reference voltage is related to an approximate initial dark current of said imaging array.

22. The imaging device of claim 18 further comprising:
an analog to digital converter to convert said analog output signal of said sample and hold circuit to a digital signal, when said integration circuit uses said digital signal to maintain said dark current offset value.

23. An imaging device compensation circuit comprising:
an input node to receive an output signal from an optically sensitive device, said optically sensitive device including an imaging array having a plurality of active photo elements and a plurality of optically dark photo elements that are shielded from incidents light;
a buffer circuit coupled to input node; and
an integrator circuit coupled to output signal of the buffer circuit, the integrator circuit having an output signal coupled to an input node of the buffer circuit via a first switch circuit.

24. The imaging device compensation circuit of claim 23 comprising:
a controller to close said first switch circuit when said input node is receiving information from said plurality of active photo elements.

25. The imaging device compensation circuit of claim 23 comprising:

a controller to open said first switch cirucit when said input node is receiving information from said plurality of optically dark photo elements.

26. The imaging device compensation circuit of claim 23 comprising:

a reference voltage circuit coupled to an input node of the buffer circuit via a second switch circuit, and a controller to close said second switch circuit when said input node is receiving information from said plurality of optically dark photo elements.

27. A method for compensating for dark current in an imaging device comprising:

receiving an output signal of an imaging array at a circuit node, said imaging array having a plurality of active photo elements and a plurality of optically dark photo elements that are shielded from incident light;

coupling a reference voltage to said circuit node when signal components are being received at said circuit node from said plurality of optically dark photo sensitive elements; and coupling a dark current offset value to said circuit node when signal components are being received at said circuit node from said plurality of active photo sensitive elements, wherein coupling a dark current offset value to said circuit node includes activating a switch located between an integrator unit and said circuit node.

28. The method of claim 27, further comprising:

removing said reference voltage from said circuit node when signal components are being received at said circuit node from said plurality of active photo sensitive elements.

29. The method of claim 27, wherein:

coupling a reference voltage to said circuit node includes activating a switch located between a reference voltage circuit and said circuit node.

30. The method of claim 27, wherein:

said reference voltage is related to an approximated initial dark current of said imaging array.

* * * * *

UNITED STATES PATENT AND TRADEMARK OFFICE
CERTIFICATE OF CORRECTION

PATENT NO. : 6,525,769 B1
DATED : February 25, 2003
INVENTOR(S) : Brent D. Thomas and Morteza Afghahi It is certified that error appears in the above-identified patent and that said Letters Patent is hereby corrected as shown below:

Title page,
Item [56], References Cited, U.S. PATENT DOCUMENTS, insert the following above "4,562,473":
-- 6,445,413 * 9/2002  Hoiser et al. ............ 348/245 --

Column 7,
Line 4, delete "-" after "is".
Line 55, delete "claim 1" and insert -- claim 8 -- therefor.
Line 66, delete "claim 1" and insert -- claim 5 -- therefor.

Column 8,
Line 4, delete "comoensation" and insert -- compensation -- therefor.
Line 44, delete "claim 18" and insert -- claim 7 -- therefor.
Line 47, delete "when" and insert -- wherein -- therefor.
Line 55, insert -- "the" -- before "input".
Line 56, insert -- "an" -- before "output".

Signed and Sealed this

Twenty-seventh Day of July, 2004

JON W. DUDAS
*Acting Director of the United States Patent and Trademark Office*